US008237988B2

(12) United States Patent
Murayama

(10) Patent No.: US 8,237,988 B2
(45) Date of Patent: Aug. 7, 2012

(54) IMAGE-FORMING DEVICE

(75) Inventor: Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 513 days.

(21) Appl. No.: 12/539,149

(22) Filed: Aug. 11, 2009

(65) Prior Publication Data

US 2010/0053649 A1 Mar. 4, 2010

(30) Foreign Application Priority Data

Sep. 1, 2008 (JP) ................................ 2008-223993

(51) Int. Cl.
*G06F 15/00* (2006.01)

(52) U.S. Cl. .......................... 358/1.9; 358/1.1; 358/1.15

(58) Field of Classification Search .................. 358/1.9, 358/3.27; 382/149
See application file for complete search history.

(56) References Cited

U.S. PATENT DOCUMENTS

| | | | |
|---|---|---|---|
| 7,822,375 B2 | 10/2010 | Osawa |
| 2008/0056777 A1 | 3/2008 | Osawa |

FOREIGN PATENT DOCUMENTS

| | | | |
|---|---|---|---|
| JP | 08-248730 | | 9/1996 |
| JP | 2000267543 | A | 9/2000 |
| JP | 2001-265086 | | 9/2001 |
| JP | 2002-023444 | | 1/2002 |
| JP | 2002023444 | * | 1/2002 |
| JP | 2002-174992 | | 6/2002 |
| JP | 2002214864 | A | 7/2002 |
| JP | 2002-351183 | | 12/2002 |
| JP | 2003-098795 | | 4/2003 |
| JP | 2003167404 | A | 6/2003 |
| JP | 2003167408 | A | 6/2003 |
| JP | 2005352291 | A | 12/2005 |
| JP | 2008064964 | A | 3/2008 |

OTHER PUBLICATIONS

English machine translation of (JP 2002-023444).*

Office Action for corresponding Japanese Patent Application 2008-223993 mailed on Jun. 8, 2010.

* cited by examiner

*Primary Examiner* — King Poon
*Assistant Examiner* — Iriana Cruz
(74) *Attorney, Agent, or Firm* — Banner & Witcoff, Ltd.

(57) ABSTRACT

An image-forming device includes an image-forming unit, a sensor, a calculating unit, and an extracting unit. The image-forming unit forms a plurality of marks on an object. The sensor detects a light reflected on the object, the reflected light including a plurality of waveforms. The calculating unit calculates a first value of each waveform in a predetermined evaluation index, a second value of a basic waveform corresponding to an ideal mark in the predetermined evaluation index, and a matching rate of each waveform with the basic waveform based on both each first value and the second value. The extracting unit extracts, from the plurality of waveforms, waveforms whose matching rates satisfy a predetermined condition.

10 Claims, 9 Drawing Sheets

IMAGE-FORMING DEVICE

CROSS REFERENCE TO RELATED APPLICATION

This application claims priority from Japanese Patent Application No. 2008-223993 filed Sep. 1, 2008. The entire content of this priority application is incorporated herein by reference.

TECHNICAL FIELD

The present invention relates to an image-forming device.

BACKGROUND

Some image-forming devices well known in the art have a function for correcting registration errors, that is, irregularities in positions at which images are formed on paper. This type of image-forming device first forms a registration pattern or other pattern configured of a plurality of marks on a conveying belt or the like. The image-forming device detects the positions of the marks on the belt with photosensors to determine positional relationships among the marks. Based on these positional relationships, the image-forming device can correct irregularities in image-forming positions.

However, the detection signal received from a photosensor sometimes includes signal waves associated with light reflected off scratches, stains, foreign matter, and the like (hereinafter referred to simply as "scratches and the like") on the belt, for example. Hence, it is possible that the image-forming device will erroneously detect these scratches and the like as marks of the pattern, reducing the accuracy with which the image-forming device can detect the positional relationships of marks.

In light of this problem, one conventional image-forming device disclosed in Japanese unexamined patent application publication No. 2003-98795 attempts to remove signal waves associated with scratches and the like (hereinafter referred to as "noise waves") from the detection signal so as to extract only the signal waves corresponding to marks (hereinafter referred to as "mark waves") by comparing the wave height of each signal wave in the detection signal to a threshold. This image-forming device is also capable of modifying the threshold value.

SUMMARY

However, if the threshold is set to a level near the height of the mark waves in order to filter noise waves with greater reliability, there is an increased likelihood that the conventional image-forming device described above will erroneously remove mark waves thought to be noise waves. On the other hand, if the threshold is set to a level far removed from the wave height of the mark waves to ensure that mark waves are detected with greater reliability, there is an increased likelihood that the image-forming device will mistakenly extract noise thought to be a mark wave.

Furthermore, in addition to noise waves caused by scratches and the like on the belt, the detection signal may include noise waves corresponding to electromagnetic noise and other factors.

In view of the foregoing, it is an object of the present invention to provide an image-forming device capable of satisfactorily extracting mark waves from a detection signal outputted from a sensor.

In order to attain the above and other objects, the invention provides an image-forming device including an image-forming unit, a sensor, a calculating unit, and an extracting unit. The image-forming unit forms a plurality of marks on an object. The sensor detects a light reflected on the object, the reflected light including a plurality of waveforms. The calculating unit calculates a first value of each waveform in a predetermined evaluation index, a second value of a basic waveform corresponding to an ideal mark in the predetermined evaluation index, and a matching rate of each waveform with the basic waveform based on both each first value and the second value. The extracting unit extracts, from the plurality of waveforms, waveforms whose matching rates satisfy a predetermined condition.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a preferred embodiment of the present invention will be described while referring to FIGS. 1 through 8.

[Overall Structure of a Printer]

Figure 1:
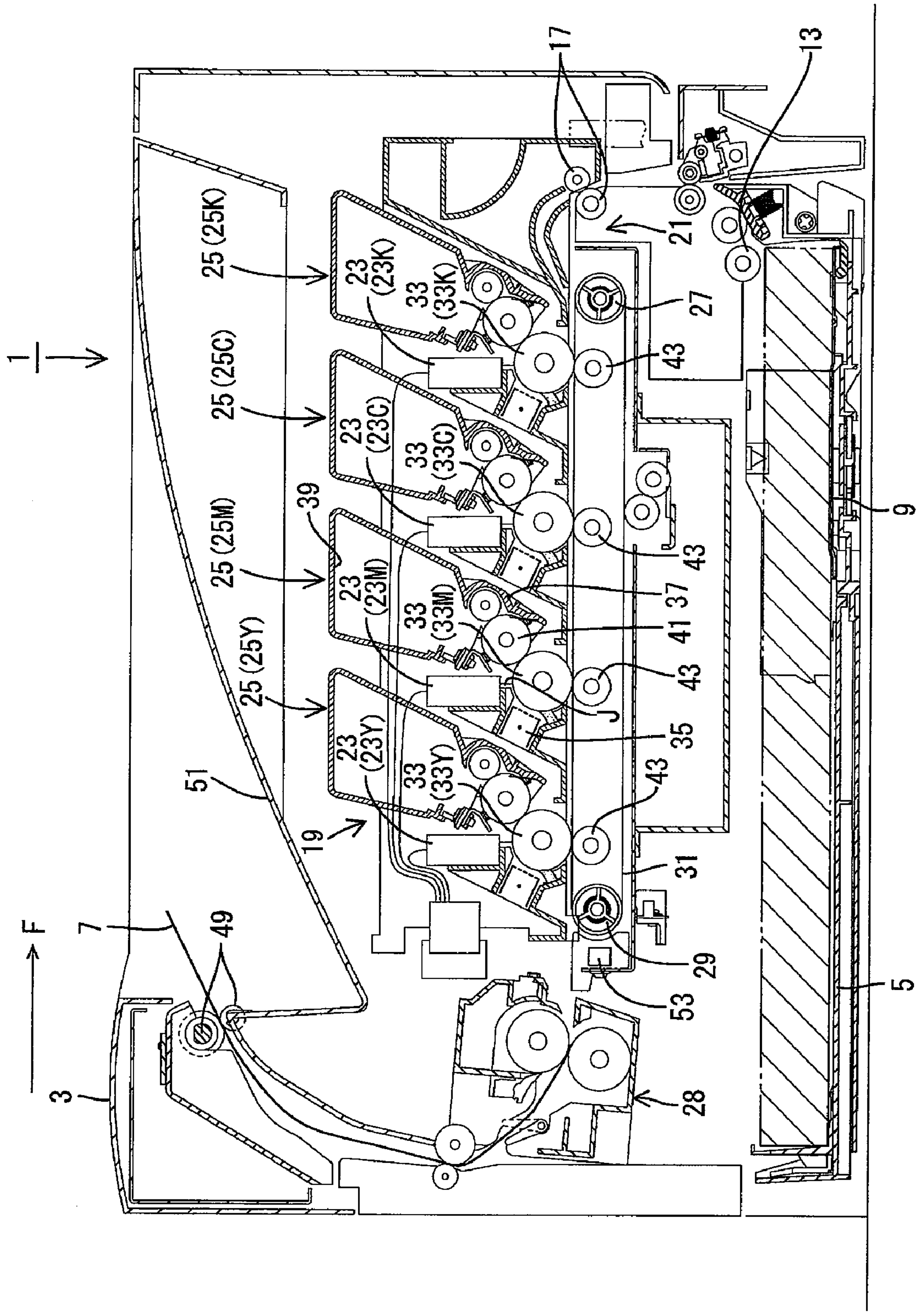
FIG. 1 is a side cross-sectional view showing an overall structure of a printer serving as a preferred embodiment of an image-forming device according to the present invention.

FIG. 1 is a side cross-sectional view showing the overall structure of a printer 1 serving as a preferred embodiment of the image-forming device according to the present invention. In the following description, the rightward direction in FIG. 1 will be the forward direction relative to the printer 1. This forward direction is indicated with an arrow F in the drawings.

The printer 1 is a color printer capable of forming color images with four colors (black, cyan, magenta, and yellow) of toner. The printer has numerous components with identical structures for each color. When differentiating these components by color in the following description, the relevant letter K for black, C for cyan, M for magenta, and Y for yellow will be appended to the reference numeral for the component to indicate the color.

The printer 1 according to the preferred embodiment is a direct transfer tandem type color LED printer. As shown in FIG. 1, the printer 1 includes a casing 3. A paper tray 5 is provided in the bottom section of the casing 3. The paper tray 5 accommodates a plurality of sheets 7 of paper or another recording medium in a stacked state. A discharge tray 51 is formed on the top surface of the casing 3.

Within the casing 3, the printer 1 is also provided with a pickup roller 13 disposed above the front end of the paper tray 5, a pressing plate 9 disposed in the bottom of the paper tray 5 beneath the sheets 7 for pressing the sheets 7 against the pickup roller 13, a pair of registration rollers 17 disposed downstream of the pickup roller 13 in the sheet-conveying direction, and an image-forming unit 19 disposed downstream of the registration rollers 17.

The image-forming unit 19 includes a belt unit 21, exposure units 23, process units 25, and a fixing unit 28. With the pressing plate 9 pressing the sheets 7 against the pickup roller 13, the pickup roller 13 rotates to feed the sheets 7 to the registration rollers 17. After correcting skew in the sheet 7 fed by the pickup roller 13, the registration rollers 17 convey the sheet 7 onto the belt unit 21 at a prescribed timing.

The belt unit 21 includes a pair of support rollers 27 and 29, and a belt 31 formed in a continuous loop and mounted over the support rollers 27 and 29. The belt 31 moves circularly in the counterclockwise direction of FIG. 1 when the support roller 29 on the rear side is driven to rotate, for example. When a sheet 7 is conveyed onto the belt 31, the circularly moving belt 31 conveys the sheet 7 rearward past each of the process units 25 and toward the fixing unit 28.

There are four exposure units 23 (23K, 23C, 23M, and 23Y) corresponding to the colors black, cyan, magenta, and yellow. Each exposure unit 23 employs an LED exposure system and includes a plurality of light-emitting diodes (LEDs; not shown) arrayed in the axial direction (also referred to as a “main-scanning direction”) of a photosensitive drum 33 described later. Each exposure unit 23 controls the on/off state of the plurality of LEDs based on image data for the corresponding color in order to irradiate the surface of the corresponding photosensitive drum 33 one scan line at a time to form an electrostatic latent image thereon.

There are also four process units 25 corresponding to the colors black, cyan, magenta, and yellow. Each process unit 25 has an identical construction, excluding the color of toner used therein. Each process unit 25 includes the photosensitive drum 33 mentioned above, a charger 35, and a developer cartridge 37. A toner-accommodating chamber 39 and a developing roller 41 are provided in the developer cartridge 37. The toner-accommodating chamber 39 accommodates toner to be supplied onto the developing roller 41.

There are also four transfer rollers 43 disposed on the inside of the belt 31 at positions opposing the photosensitive drums 33 through the belt 31, and photosensors 53 described later in greater detail disposed along the rear end of the belt unit 21.

In an image-forming operation, each of the chargers 35 applies a uniform positive charge to the surface of the respective photosensitive drum 33. Subsequently, the exposure unit 23 irradiates a light beam onto the charged surface of the photosensitive drum 33 to form an electrostatic latent image corresponding to the respective color image to be formed on the sheet 7. Next, the toner carried on the surface of the developing roller 41 is supplied to the electrostatic latent image formed on the surface of the photosensitive drum 33, thereby developing the electrostatic latent image into a visible toner image for the corresponding color.

Subsequently, a transfer bias is applied to the transfer rollers 43, causing the toner images carried on the surfaces of the photosensitive drums 33 to be sequentially transferred onto the sheet 7 conveyed on the belt 31, as the sheet 7 passes through transfer positions between each photosensitive drum 33 and corresponding transfer roller 43. After the toner images have been transferred onto the sheet 7, the toner images are fixed to the sheet 7 in the fixing unit 28. Subsequently, discharge rollers 49 disposed downstream of the fixing unit 28 discharge the sheet 7 out of the casing 3 onto the discharge tray 51.

Figure 2:
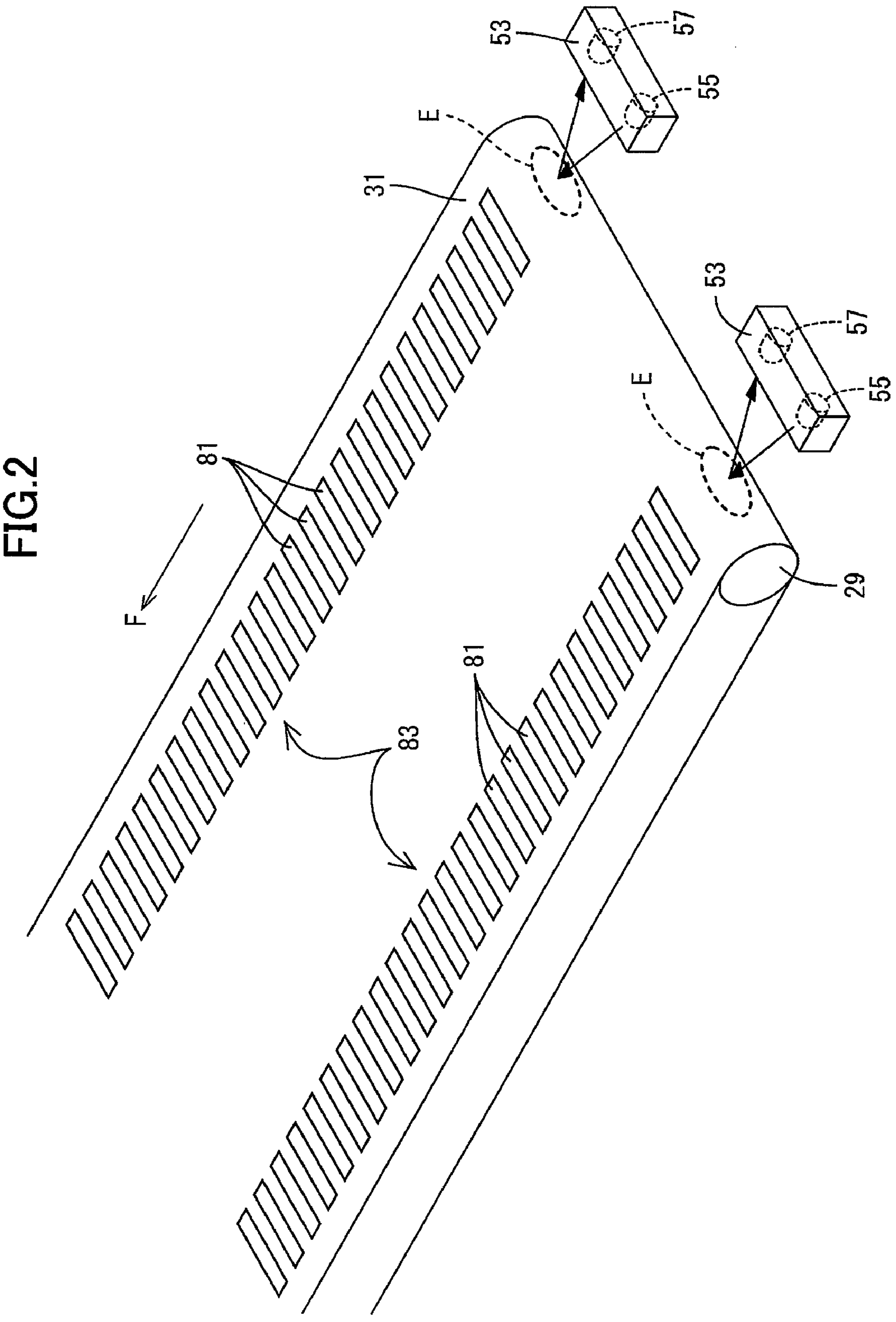
FIG. 2 is a perspective view of photosensors and a belt.

FIG. 2 is a perspective view of the photosensors 53 and the belt 31. As shown in FIG. 2, the printer 1 includes one or a plurality (two in the preferred embodiment) of photosensors 53. The photosensors 53 are juxtaposed in the left-to-right direction along the rear of the belt 31. Each photosensors 53 is a reflective sensor having a light-emitting element 55 (LED, for example) and a light-receiving element 57 (phototransistor, for example). The light-emitting element 55 irradiates light obliquely onto the surface of the belt 31, while the light-receiving element 57 receives light reflected off the surface of the belt 31 and outputs a detection signal SA corresponding to the level of received light. A spot region formed on the belt 31 by light emitted from the light-emitting element 55 is designated as a detection region E for the corresponding photosensor 53.

[Electrical Structure of the Printer]

Figure 3:
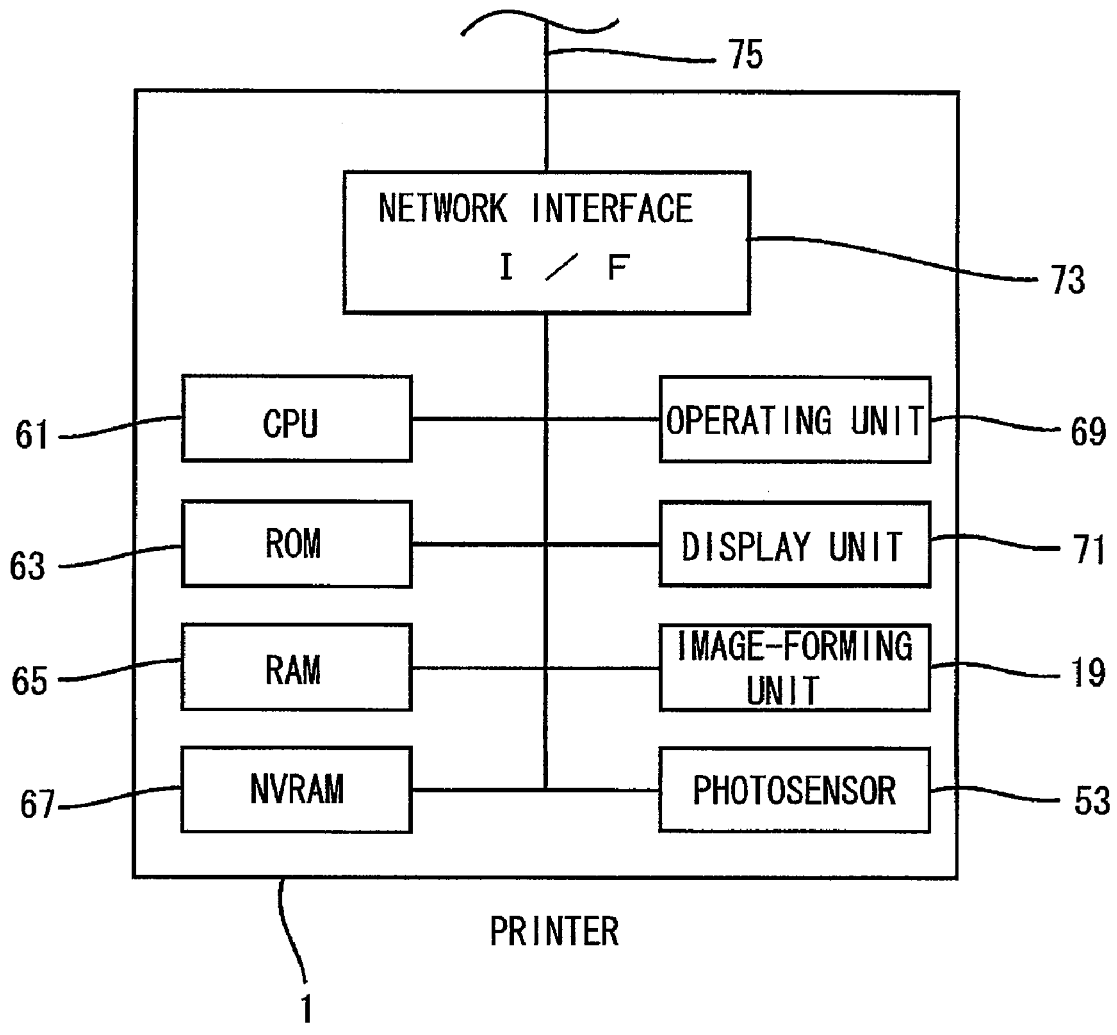
FIG. 3 is a block diagram showing an electrical structure of the printer.

FIG. 3 is a block diagram showing the electrical structure of the printer 1. As shown in FIG. 3, the printer 1 includes a CPU 61, a ROM 63, a RAM 65, an NVRAM 67, an operating unit 69, a display unit 71, the image-forming unit 19 mentioned earlier, a network interface 73, and the photosensors 53.

The ROM 63 stores various programs for controlling operations of the printer 1, including a program for implementing a process to calibrate the spacing of formed lines, which will be described later. The CPU 61 controls operations of the printer 1 while storing processing results in the RAM 65 or NVRAM 67 based on programs read from the ROM 63.

The operating unit 69 includes a plurality of buttons that enable a user to perform various input operations, such as an instruction to initiate a printing operation. The display unit 71 is configured of a liquid crystal display and lamps and is capable of displaying various configuration screens, the operation status of the printer, and the like. The network interface 73 is connected to an external computer (not shown) via a telephone network 75 and is capable of implementing bi-directional data communications with the external computer.

[Process to Calibrate Formed Line Spacing]

(1) Overview of the Process to Calibrate Formed Line Spacing

The rotational speeds of the photosensitive drums 33 and the belt 31, for example, are not always uniform, but tend to fluctuate. Consequently, even if the exposure time for each scan line (the time interval allotted for each exposure unit 23 to write a scan line) is uniform, the spacing between lines constituting an image formed on the sheet 7 (hereinafter referred to as “formed lines”) deviate from the prescribed line spacing, potentially resulting in poor image quality.

Therefore, the CPU 61 of the printer 1 executes a process to calibrate the formed line spacing when a prescribed condition has been met. This prescribed condition may be, for example, a developer cartridge 37 being replaced because toner in the old cartridge was consumed or the belt unit 21 being replaced due to deterioration thereof. By executing this calibration process, the CPU 61 appropriately calibrates the exposure time per scan line by the exposure units 23 in order to reduce variations in the formed line spacing caused by fluctuations in the rotational speed of the photosensitive drums 33 and the like.

Specifically, as illustrated in FIG. 2, the CPU 61 forms a detection pattern 83 configured of a plurality of marks 81 on the belt 31 and employs the photosensors 53 to determine positional relationships among the marks 81 formed on the belt 31. Since the results of this determination vary in response to fluctuations in the rotational speed of the photosensitive drums 33 and the like, the CPU 61 can ascertain calibration amounts for correcting exposure times in order to make the spacing between formed lines uniform. The calibration amounts are stored in the NVRAM 67. Thereafter, when executing a normal image-forming operation in response to a print command received from the external computer, for example, the CPU 61 controls the exposure units 23 to expose the photosensitive drums 33 for each scan line at the exposure times corrected by the calibration amounts. As a result, the printer 1 can form high-quality images on the sheet 7 with uniform spacing between formed lines.

Figure 4:
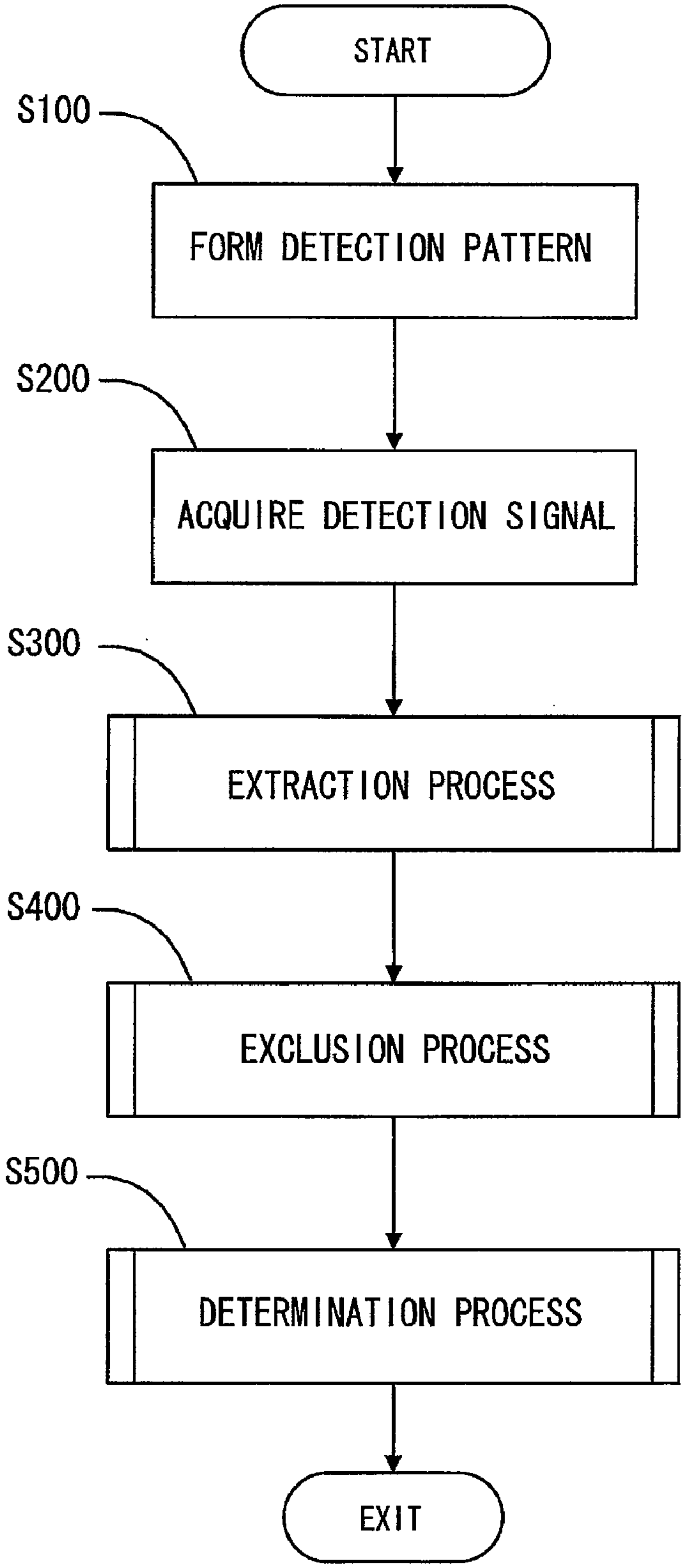
FIG. 4 is a flowchart illustrating steps in a process to calibrate formed line spacing.

FIG. 4 is a flowchart illustrating steps in the process to calibrate formed line spacing. The CPU 61 executes this calibration process for each color black, cyan, magenta, and yellow. Next, a description of the process will be given using the example of black.

(2) The Detection Pattern Forming Process and Screening Process

In S100 of FIG. 4, the CPU 61 controls the black process unit 25K to form the detection pattern 83 one line at a time in areas of the belt 31 that will pass through the detection regions E of the photosensors 53. The detection pattern 83 is configured of the plurality of black marks 81 juxtaposed in the rotating direction of the belt 31 (also referred to as a "sub-scanning direction") over a distance equivalent to at least one rotation of the photosensitive drum 33. In the preferred embodiment, the number of marks 81 formed in the detection pattern 83 is equivalent to the number of exposure lines that can be exposed during one rotation of the photosensitive drum 33 (N in this example) plus four (i.e., N+4).

In S200 the CPU 61 begins to acquire detection signals SA from the photosensors 53 at a prescribed acquisition start timing. The CPU 61 performs A/D conversion on the acquired detection signal SA to ascertain the actual signal waveform of the detection signal SA in digital form.

Figure 5:
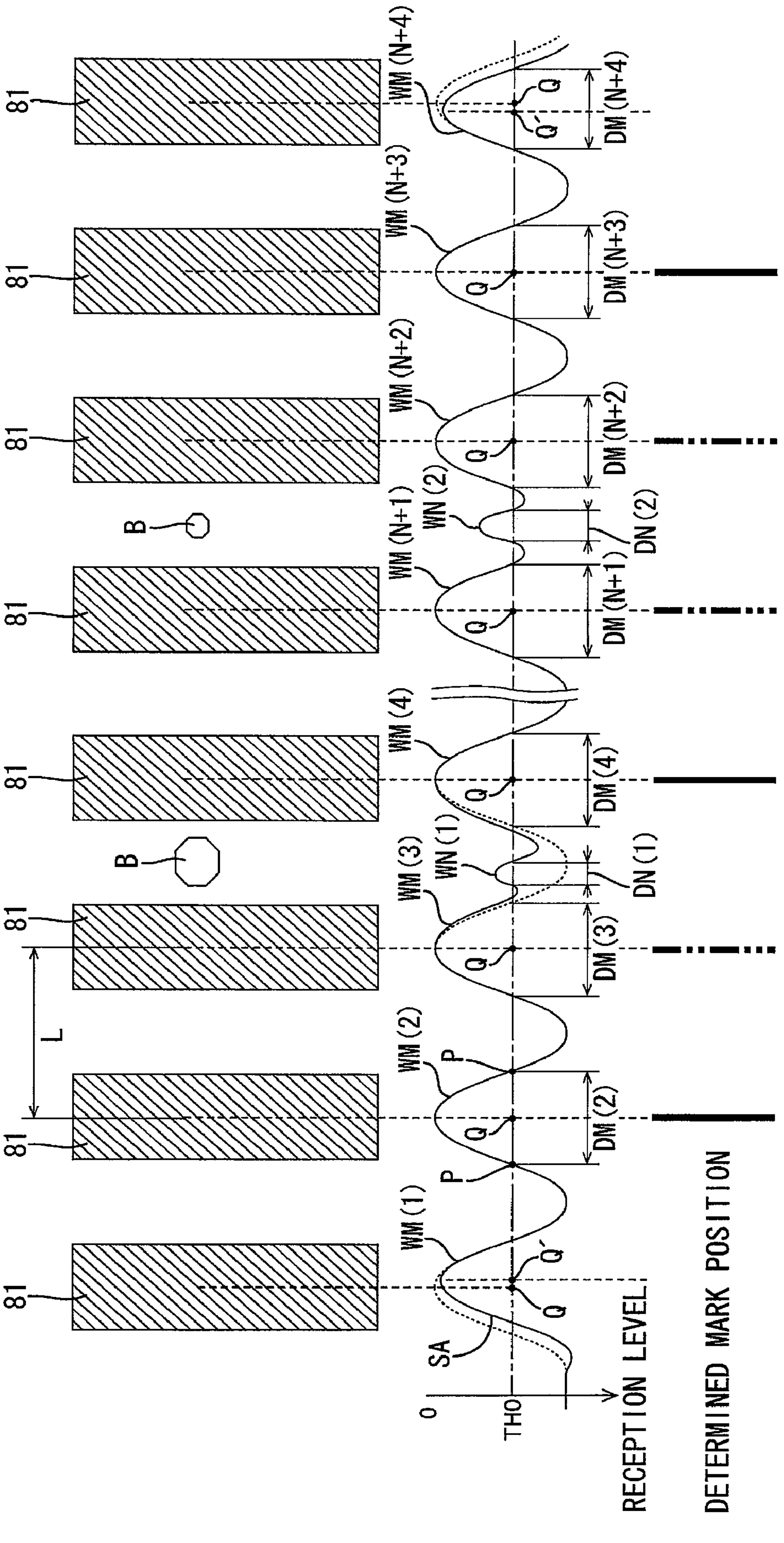
FIG. 5 shows marks formed on the belt, signal waveforms of detection signals, and determined relationships among the mark positions.

FIG. 5 shows the marks 81 formed on the belt 31, the signal waveform of the detection signal SA, and the determined relationships among the mark positions. In the waveform of the detection signal SA, a lower wave position indicates a higher reception level (amount of received light) at the light-receiving element 57. The reflectance of light is greater in areas on the surface of the belt 31 at which marks 81 are not formed (hereinafter referred to as the "belt surface"). Accordingly, signal waves corresponding to the marks 81 stand out when compared to the signal level corresponding to the belt surface. Hereafter, a signal wave corresponding to an actual mark 81 will be referred to as an "actual mark wave WM."

In S200 of FIG. 4, the CPU 61 also performs a screening process to screen actual mark waves WM and signal waves corresponding to the belt surface based on the detection signal SA. A screening value TH0 is a threshold used to make this screening. Among the plurality of signal waves included in the detection signal SA, the CPU 61 considers a signal wave with a wave height that exceeds the screening value TH0 to be a signal wave corresponding to a mark, and a signal wave with a wave height less than or equal to the screening value TH0 to be a signal wave corresponding to the belt surface. In this way, the CPU 61 can filter in advance signal waves that clearly do not correspond to marks. Signal waves found to correspond to marks in this screening will be referred to as "screened signal waves WD."

In the process for calibrating formed line spacing, the CPU 61 determines in principle the positions of the marks 81 for the set of screened signal waves WD based on two intersecting points P at which the wave intersects the screening value TH0 (see FIG. 5). More specifically, the CPU 61 sets the position of the mark 81 to a center position Q between the two intersecting points P and subsequently determines the positional relationships of the group of marks in the detection pattern 83.

However, in the preferred embodiment, the actual mark waves WM(1) and WM(N+4) corresponding to marks 81 positioned on the upstream and downstream ends of the detection pattern 83 in the circulating direction of the belt 31 are removed from consideration for the determination process. In other words, the CPU 61 does not set the actual mark waves on the upstream and downstream ends as screened signal waves WD. The reason for this will be described next.

When a mark 81 advances into the detection region E of the photosensor 53, the light-receiving element 57 does not simply receive light reflected from the mark 81, but also receives scattered light reflected from the region around the mark 81. Therefore, even when two actual mark waves WM correspond to marks 81 of the same color (same reflectance), the waveforms of the actual mark waves WM differ due to the reflectance in the region surrounding the marks 81.

More specifically, when considering the mark 81 corresponding to the actual mark wave WM(2) in FIG. 5, for example, a similar mark 81 is present in regions before and after this mark 81 with respect to the left-to-right direction in FIG. 5. Accordingly, the actual mark wave WM(2) sandwiched between two other actual mark waves WM has a substantially symmetric waveform in the left-to-right direction because the scattered light on the front and rear sides of the actual mark wave WM(2) is approximately the same level. Accordingly; the center position Q in the waveform accurately indicates the position of the corresponding mark 81 (center position).

In contrast, when considering the mark 81 corresponding to the actual mark wave WM(1) positioned on an end of the detection pattern 83, an adjacent mark 81 is present only on the rear side and not on the front side. Consequently, the actual mark wave WM(1) has an asymmetric waveform in the left-to-right direction (indicated by the solid line) because the scattered light on the front side is greater than the scattered light on the rear side. The dotted line in FIG. 5 shows a waveform with left-to-right symmetry that would be outputted if marks 81 were present on both front and rear sides of the actual mark wave WM(1). Hence, a center position Q' in an asymmetric waveform deviates from the center position Q in a symmetric waveform indicating the position (center position) of the corresponding mark 81, making this data less reliable. The actual mark wave WM(N+4) is similarly asymmetric in the left-to-right direction and, thus, produces less reliable data.

Consequently, the actual mark waves WM(1) and WM(N+4) corresponding to the marks 81 positioned on the upstream and downstream ends of the detection pattern 83 are not subjected to the determination process, and their data is not used in the process for calibrating formed line spacing. The actual mark waves WM(1) and WM(N+4) can be identified based on time differentials from the starting point for forming the detection pattern 83 or the starting point for acquiring the detection signal SA to points for detecting each signal wave.

(3) Noise Waves

In some cases, the belt 31 may have scratches B, as indicated in FIG. 5, or other damage or deposits. If the reflectance in the regions of a scratch B is lower than that of the belt surface, the signal wave corresponding to the scratch B may have a wave height that exceeds the screening value TH0, resulting in the scratch B being determined as a screened signal wave WD. In such a case, the CPU 61 will erroneously recognize this position as a mark 81 when no such mark 81 exists, and will be unable to determine the positional relationships of the marks with accuracy. Signal waves that do not correspond to actual marks 81 (hereinafter referred to as "actual noise waves WN") are produced not just by scratches B on the belt 31, but also by stains, foreign matter, and the like deposited on the belt 31, as well as electromagnetic noise in the detection signal SA from peripheral equipment or the printer 1 itself. To avoid recognizing these scratches and the like as marks 81, the CPU 61 executes the following extraction process.

(4) Extraction Process

Figure 6:
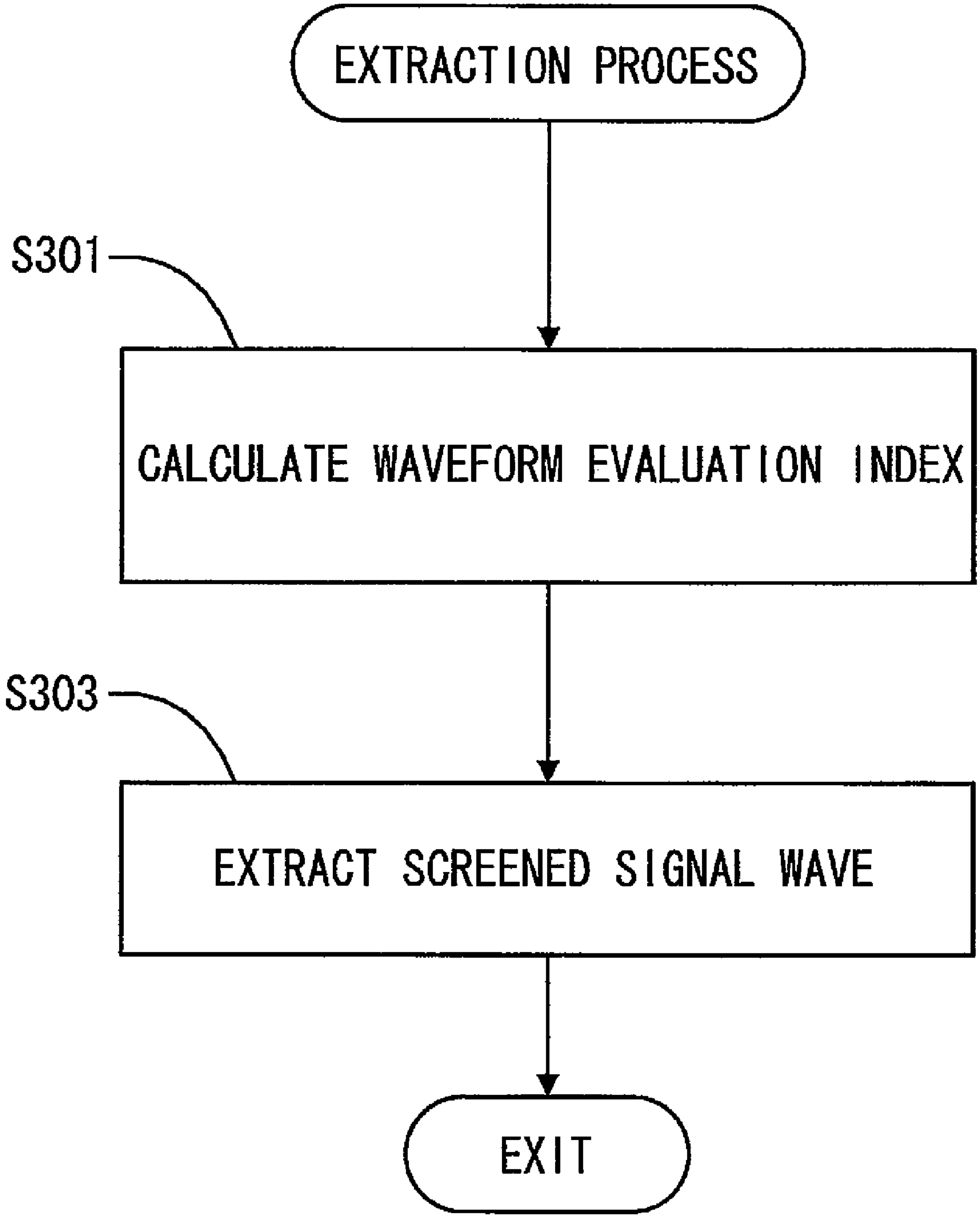
FIG. 6 is a flowchart illustrating steps in an extraction process.

FIG. 6 is a flowchart illustrating steps in the extraction process. By executing this extraction process, the CPU 61 extracts screened signal waves WD whose matching rates in a predetermined evaluation index waveform with a basic waveform corresponding to a mark are equal to or more than a predetermined rate, that is, extracts screened signal waves WD that are closed to a basic waveform corresponding to a mark in a predetermined evaluation index, as signal waves corresponding to the mark.

Specifically, in S301 of FIG. 6, the CPU 61 calculates an evaluation index for each screened signal wave WD determined in the determination process. In the preferred embodiment, the evaluation indices are wave widths DM (DN). The wave widths DM (DN) are distances (time differences) between two intersecting points P at which the waveform of the screened signal wave WD intersects the screening value TH0. The CPU 61 also calculates an average value DA and a standard deviation SD based on the wave widths DM (DN) for all screened signal waves WD.

In S303 the CPU 61 extracts screened signal waves WD whose wave widths DM (DN) fall within a first prescribed range, as probable mark waves WM'. In the preferred embodiment, the first prescribed range can be represented by the following expression, using the average value DA, the standard deviation SD, and coefficient "k".

$$DA-(k\cdot SD)<\text{first prescribed range}<DA+(k\cdot SD)$$

Through this process, the CPU 61 can extract, as probable mark waves WM', screened signal waves WD whose wave width DM (DN) that are closed to the average value DA in order of screened signal waves WD whose wave width DM (DN) are most closed to the average value DA, regardless of the distribution of wave widths. In the preferred embodiment, the coefficient "k" is set to "1", setting the first prescribed range to approximately the upper 90% of all screened signal waves WD having wave widths DM (DN) that are most closed to the average value DA. The user can modify the first prescribed range by changing the setting for the coefficient "k" through an operation on the operating unit 69, for example.

When the entire group of screened signal waves WD is considered, there is a large discrepancy in the waveform evaluation index between the group of actual mark waves WM and the group of actual noise waves WN. In the example of FIG. 5, the actual noise waves WN are shown with smaller waveforms than the actual mark waves WM. Further, while the group of screened signal waves WD includes some actual noise waves WN, most of the screened signal waves WD are actual mark waves WM. Hence, the average value DA of the wave widths DM and DN for the entire group of screened signal waves WD nearly matches the average value for the group of actual mark waves WM, or the wave width of the basic waveform used as a representative waveform.

Accordingly, by extracting the screened signal waves WD belonging to the range corresponding to the standard deviation SD (the range corresponding to k·SD), the CPU 61 gives priority to screened signal waves WD that match the basic waveform with great accuracy. As a result, the CPU 61 can give priority to extracting actual mark waves WM from the screened signal waves WD while almost entirely excluding actual noise waves WN. Therefore, in S303 the CPU 61 extracts screened signal waves WD whose wave widths DM fall into the first prescribed range as the probable mark waves WM', and treats the screened signal waves WD outside of the first prescribed range as waves corresponding to noise. The latter screened signal waves WD are not extracted. Based on the example shown in FIG. 5, the CPU 61 extracts N+2 actual mark waves WM(2 through N+3) as probable mark waves WM', while ignoring actual noise waves WN(1, 2).

Through the extraction process described above, the CPU 61 can eliminate actual noise waves WN with a screening value TH0 used for screen actual mark waves WM and signal waves corresponding to the belt surface, without using a threshold for noise wave removal. Further, it is possible to adjust the sensitivity of the determination process by freely modifying the screening value TH0, aside from the extraction process.

In addition, the average value DA used as a reference for determining the closeness of the screened signal waves WD with the basic waveform is set based on the signal waves included in the detection signal SA. Hence, even if the absolute reception level at the photosensor 53 declines due to degradation in the belt 31, for example, the extraction process can still be performed with approximately the same precision since the average value DA also changes based on the drop in reception level.

(5) Exclusion Process

Even though the actual noise waves WN(1, 2) can be excluded through the extraction process described above, the waveforms of the actual mark waves WM(3, 4, N+1, N+2 adjacent to these actual noise waves WN(1, 2) (hereinafter referred to as "noise-adjacent waves") are asymmetric in the left-to-right direction due to the influence of the actual noise waves WN(1, 2). Consequently, as with the actual mark waves WM(1, N+4) on the upstream and downstream ends of the detection pattern 83, these actual mark waves WM may also be less reliable as data for identifying mark positions. Accordingly, in S400 of FIG. 4 the CPU 61 executes an exclusion process to exclude these actual mark signal waves WM.

Figure 7:
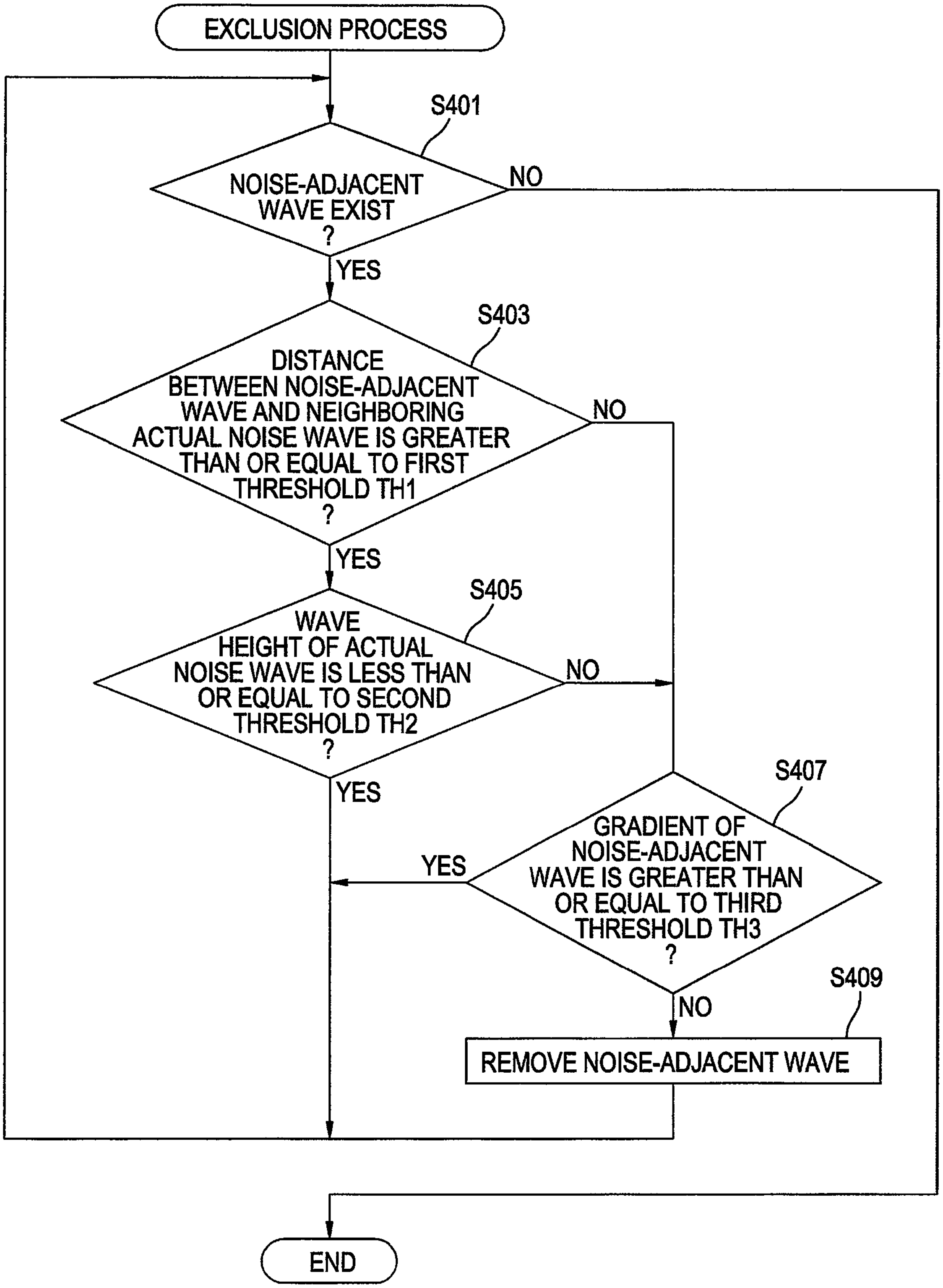
FIG. 7 is a flowchart illustrating steps in an exclusion process.

FIG. 7 is a flowchart illustrating steps in the exclusion process. The CPU 61 executes the exclusion process to remove probable mark waves WM' from the group extracted in the extraction process that have been influenced by the actual noise waves WN and have low reliability as data for identifying a mark position.

In S401 at the beginning of this process, the CPU 61 determines whether any noise-adjacent waves exist in the group of probable mark waves WM'. In the example of FIG. 5, the waveforms for actual mark waves WM(3, 4, N+1, N+2) are sequentially selected as noise-adjacent waves. The CPU 61 then proceeds to determine whether each of these noise-adjacent waves has sufficiently low reliability as mark position identification data to adversely affect the process for calibrating formed line spacing.

In S403 the CPU 61 determines whether the distance between the noise-adjacent wave and the neighboring actual noise wave WN (for example, the distance between center positions Q of the wave widths DM and DN) is greater than or equal to a first threshold TH1. If less than the first threshold TH1 (S403: NO), the CPU 61 considers that the noise-adjacent wave is greatly influenced by the actual noise wave WN and has low reliability as mark position identification data. Hence, the CPU 61 sets the noise-adjacent wave as a candidate for exclusion and advances to S407.

However, if the distance is greater than or equal to the first threshold TH1 (S403: YES), the CPU 61 considers that the noise-adjacent wave is influenced little by the actual noise wave WN and sustains sufficient reliability as mark position identification data. In this case, the CPU 61 advances to S405. In the example shown in FIG. 5, the CPU 61 sets the actual mark wave WM(3) in proximity to the actual noise wave WN(1) as a candidate for exclusion, but does not set the actual mark wave WM(4) separated from the actual noise wave WN(1) as a candidate for exclusion. Further, the actual noise wave WN(2) is positioned almost in the center of the actual mark waves WM(N+1, N+2). In the preferred embodiment, the distances between the center of the actual noise wave WN(2) and the center of the actual mark waves WM(N+1, N+2) is greater than or equal to the first threshold TH1, neither of the actual mark waves WM(N+1, N+2) are set as candidates for exclusion.

In S405 the CPU 61 determines whether the wave height of the actual noise wave WN adjacent to the noise-adjacent wave is less than or equal to a second threshold TH2. If the wave height exceeds the second threshold TH2 (S405: NO), the CPU 61 considers that the noise-adjacent wave is greatly influenced by the actual noise wave WN and has low reliability as mark position identification data. Accordingly, the CPU 61 sets this noise-adjacent wave as a candidate for exclusion and advances to S407.

However, if the wave height is less than or equal to the second threshold TH2 (S405: YES), the CPU 61 considers that the noise-adjacent wave is influenced little by the actual noise wave WN and retains sufficient reliability as mark position identification data. Accordingly, the CPU 61 returns to S401. In the preferred embodiment, the wave height of the actual noise wave WN(2) in FIG. 5 exceeds the second threshold TH2. Hence, the CPU 61 sets the neighboring actual mark waves WM(N+1, N+2) as candidates for exclusion.

In S407 the CPU 61 determines whether the gradient of the noise-adjacent wave set as a candidate for exclusion in S403 or S405 (variation in the waveform before and after the point that intersects the screening value TH0, for example) is greater than or equal to a third threshold TH3. If greater than or equal to the third threshold TH3 (S407: YES), the CPU 61 considers that noise-adjacent wave is almost not influenced by differences in scattered light caused by the presence of the actual noise wave WN, even if the noise-adjacent wave is close to the actual noise wave WN or the wave height of the actual noise wave WN is great, and considers that the noise-adjacent wave has sufficient reliability as mark position identification data. Accordingly, the CPU 61 removes the noise-adjacent wave as a candidate for exclusion. In other words, the CPU 61 does not exclude this noise-adjacent wave from the group of probable mark waves WM'.

However, if the gradient is less than the third threshold TH3 (S407: NO), the CPU 61 determines that the noise-adjacent wave has low reliability as mark position identification data. Accordingly, in S409 the CPU 61 removes this noise-adjacent wave from the group of probable mark waves WM'. Since there is a larger difference in reflectances between black marks 81 and the surface of the belt 31 than in reflectances between other colors of marks 81 and the surface of the belt 31, the noise-adjacent waves corresponding to black marks 81 have a relatively larger gradient and are thus more likely to be removed as candidates for exclusion in S407. After executing the above process for all noise-adjacent waves (S401: NO), the CPU 61 ends the exclusion process.

(6) Determination Process

Once the actual mark waves WM(3, N+1, N+2) have been excluded in the exclusion process, the CPU 61 cannot set mark positions corresponding to these actual mark waves WM. The solid lines in the bottom section of FIG. 5 indicate the results of setting positions for the marks 81 based on the now remaining group of probable mark waves WM'. At this time, the CPU 61 executes the determination process in S500 of FIG. 4 to set the final positions of the mark 81 while correcting their positions.

Figure 8:
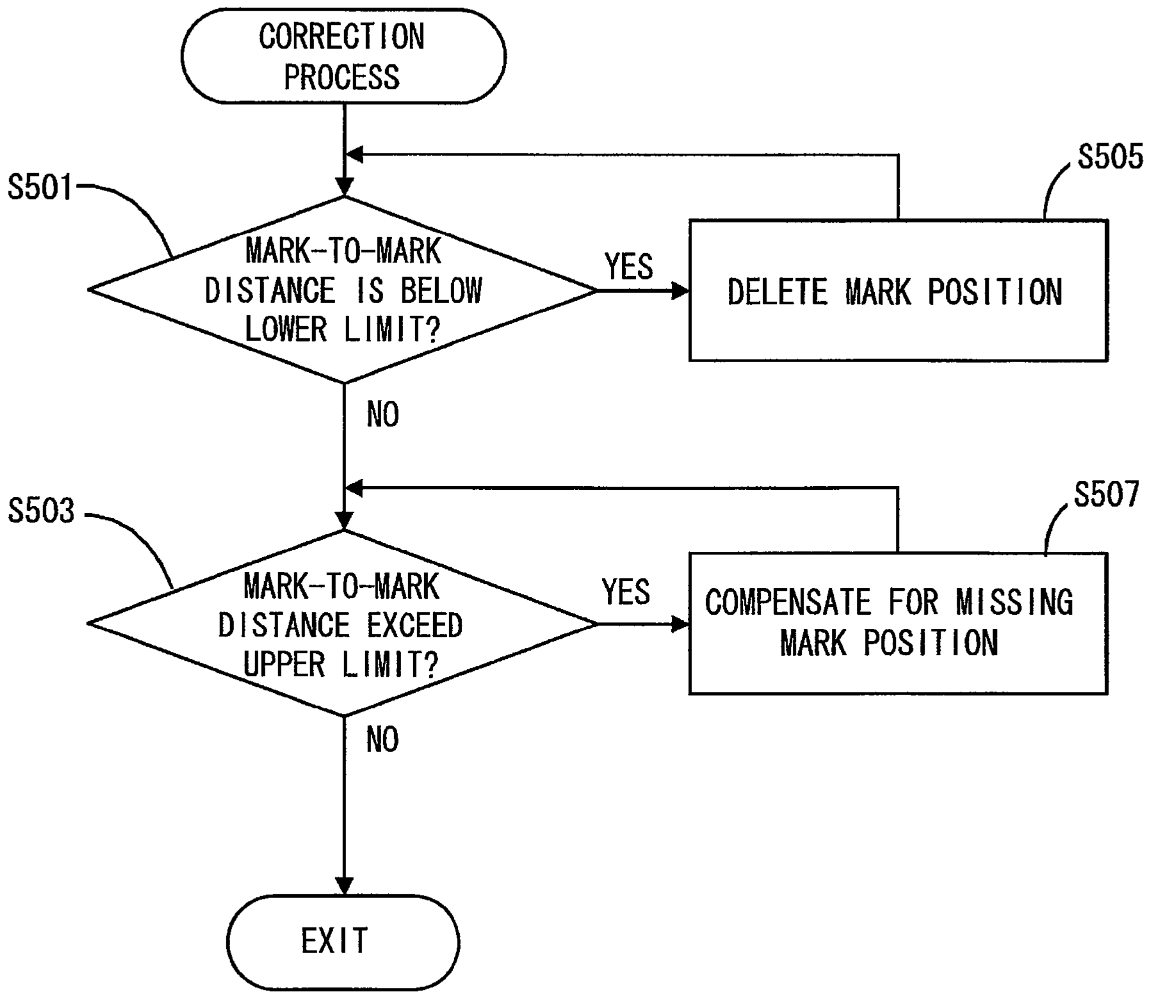
FIG. 8 is a flowchart illustrating steps in a determination process for correcting the positions of the marks.

FIG. 8 is a flowchart illustrating steps in only the part of the determination process for correcting the positions of the marks 81. In S501 of FIG. 8, the CPU 61 finds the distances between neighboring probable mark waves WM' in the remaining group (hereinafter referred to as a "mark-to-mark distance L") and determines whether any of these mark-to-mark distances L is below a lower limit. If any mark-to-mark distance L is below the lower limit (S501: YES), the CPU 61 concludes that the remaining group of probable mark waves WM' includes an actual noise wave WN and executes a process to delete the mark position in S505.

For example, if the wave width of the actual noise wave WN(2) were larger than that shown in FIG. 5 and the actual noise wave WN(2) was extracted as a probable mark wave WM' in the extraction process, then the actual mark waves WM(N+1, N+2) positioned adjacent to the actual noise wave WN(2) would not have been excluded in the exclusion process. Consequently, the two mark-to-mark distances L between the actual noise wave WN(2) and each of the actual mark waves WM(N+1, N+2) would be less than the lower limit, and the position of the mark dividing these two mark-to-mark distances L would be deleted as a mark position corresponding to the actual noise wave WN(2). Subsequently, the CPU 61 returns to S501.

However, if none of the mark-to-mark distances L are less than the lower limit, or when there are no longer any mark-to-mark distances L less than the lower limit (S501: NO), in S503 the CPU 61 determines whether any of the mark-to-mark distances L exceed an upper limit. If any mark-to-mark distances L exceed the upper limit (S503: YES), the CPU 61 assumes that an actual mark wave WM was excluded in the exclusion process and in S507 executes a process to compensate for the missing mark position. Since actual mark waves WM(3, N+1, N+2) were excluded in the example of FIG. 5, it is necessary to compensate for the corresponding mark positions.

One method of compensation is to divide each mark-to-mark distance L exceeding the upper limit by the prescribed line spacing and round the quotient to the nearest integer value. Subsequently, mark positions of a number equivalent to one less than this integer value are arranged uniformly within the mark-to-mark distance L or are arranged to correspond to an increasing or decreasing trend found in a plurality of other mark-to-mark distances L before or after the current mark-to-mark distance L. If there are no longer, or never were, any mark-to-mark distances L that exceed the upper limit (S503: NO), the CPU 61 ends the correction process.

Through the correction process described above, the CPU 61 adds mark positions indicated by broken lines with alternating dashes and double dots in the bottom section of FIG. 5, thereby setting the positional relationships of marks in the detection pattern 83. Subsequently, the CPU 61 generates calibration data for producing uniform formed line spacing based on the positional relationships among marks in the detection pattern 83 and stores this calibration data in the NVRAM 67. If calibration data already exists in the NVRAM 67, this data is updated by the new data.

<Variations>

While the invention has been described in detail with reference to the specific embodiment thereof, it would be apparent to those skilled in the art that various changes and modifications may be made therein without departing from the spirit of the invention.

(1) In the extraction process of the preferred embodiment described above, the printer 1 extracts screened signal waves WD that fall within a range based on the standard deviation SD, but the printer 1 may be configured to extract screened signal waves WD whose wave widths DM (DN) are within a prescribed range from the average value DA. However, the configuration of the preferred embodiment makes it easy to set and adjust the extraction number since the printer 1 can extract screened signal waves WD that fall within a percentage range based on the coefficient “k”.

(2) In the preferred embodiment described above, the printer 1 determines how closely waveforms of screened signal waves WD match a basic waveform corresponding to a mark based on an average value of waveform evaluation indices (wave widths) for the group of screened signal waves WD. However, the printer 1 may make this determination based on a mean value between minimum and maximum evaluation indices for the group of screened signal waves WD or based on the minimum or maximum evaluation indices, as in variation (4) described below. Further, the reference value may be predetermined based on design or through experimentation, rather than being set based on the group of screened signal waves WD. In other words, the reference value may be set to the evaluation index of a representative, basic, or ideal waveform in the group of actual mark waves WM.

(3) In the preferred embodiment described above, the first prescribed range is modified according to the standard deviation. However, the first prescribed range may be modified based on the difference between the minimum and maximum evaluation indices for the group of screened signal waves WD. In other words, the first prescribed range may be modified based on the degree of variation among evaluation indices for waveforms among the group of screened signal waves WD.

(4) Further, when the waveforms in the group of actual mark waves WM as a whole are larger than the waveforms in the group of actual noise waves WN, as in the example of FIG. 5, the waveform in the group of screened signal waves WD having the largest evaluation index may be treated as the basic waveform to be used as a representative waveform for the group of actual mark waves WM. Hence, the printer 1 can extract a prescribed number or prescribed percentage of screened signal waves WD having the largest waveform indices as the probable mark waves WM'.

Figure 9:
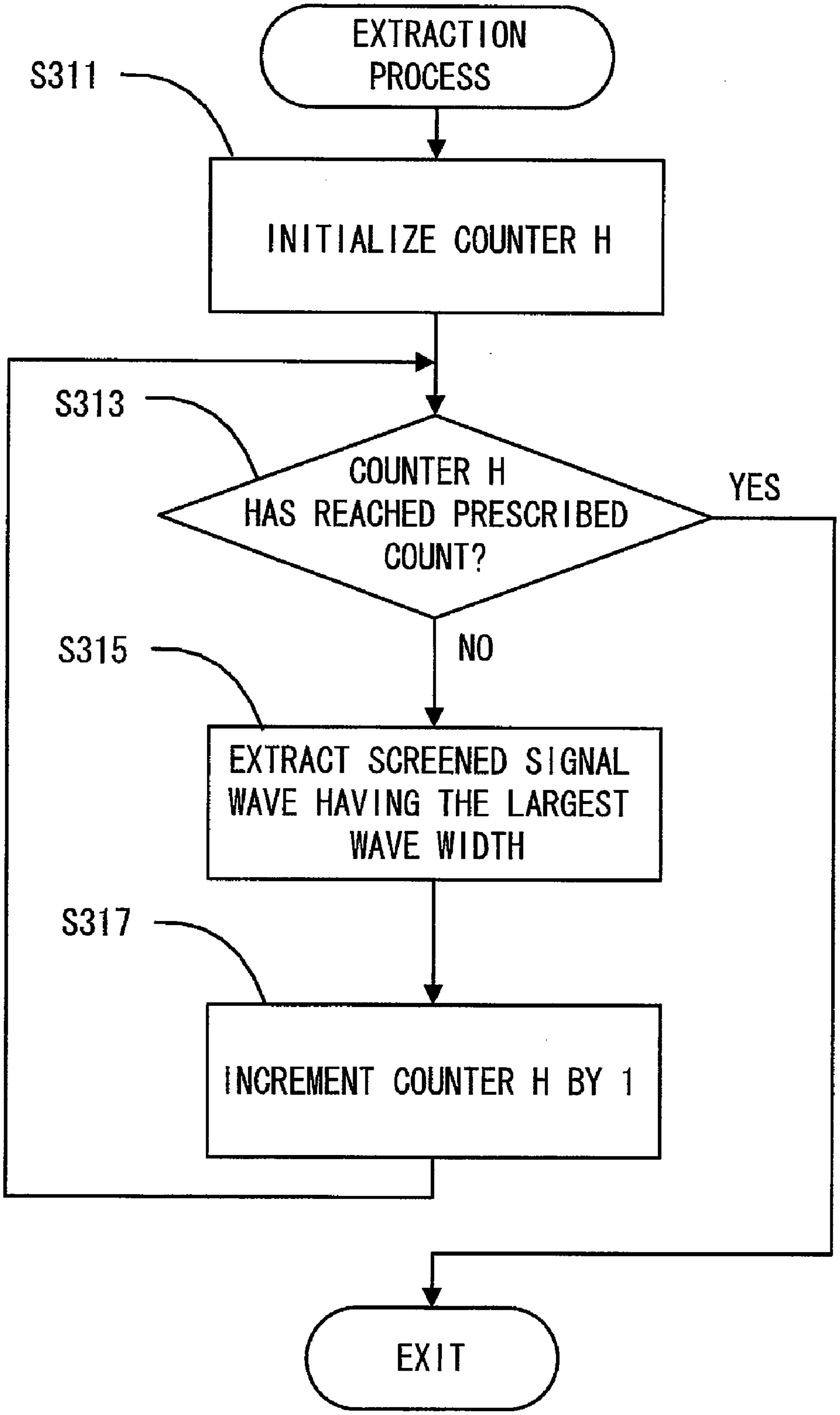
FIG. 9 is a flowchart illustrating steps in an extraction process according to a variation.

This process is described in greater detail in the flowchart of FIG. 9. In S311 of FIG. 11, the CPU 61 initializes a counter H and in S313 determines whether the counter H has reached a prescribed count. While the counter H has not reached the prescribed count (S311: NO), in S315 the CPU 61 extracts the screened signal wave WD having the largest wave width DM and DN as a probable mark wave WM', in S317 increments the counter H by 1, and returns to S313. Thereafter, the CPU 61 sequentially extracts the screened signal wave WD having the next largest wave width DM and DN as probable mark waves WM' from the remaining group of screened signal waves WD excluding those previously extracted. When the counter H reaches the prescribed count, i.e., when the CPU 61 has extracted the prescribed number of probable mark waves WM' (S313: YES), the CPU 61 ends the extraction process.

Alternatively, the printer 1 may instead delete a prescribed number or prescribed percentage of screened signal waves WD in order from those having the smallest waveform evaluation indices as signal waves corresponding to noise, and extract the remaining group of screened signal waves WD as the probable mark waves WM'. In this case, actual noise waves WN having a greater wave height than the actual mark waves WM can be deleted.

(5) By forming the detection pattern 83 with a number of marks sufficiently larger than the number required in the calibration process, it is possible to reduce the probability of actual noise waves WN being extracted as probable mark waves WM'. It is also possible to store the number of actual noise waves WN that were removed in a previous calibration process in the NVRAM 67 and to adjust the number of marks formed in the detection pattern 83 based on this number stored in the NVRAM 67 when performing subsequent calibration processes.

(6) While the waveform evaluation indices used in the extraction process are the wave widths DM and DN in the preferred embodiment, the evaluation indices may instead be the height of the signal wave, the position of the signal wave relative to other signal waves (for example, the distances to neighboring signal waves; i.e., the phase difference), the area of the waveform, or the like. Two or more of these evaluation indices may be used to determine how closely the signal wave matches the basic waveform. More accurate determinations can be achieved if signal waves are set as probable mark waves WM' when the height of the signal wave falls within the first prescribed range and the distances to other signal waves fall within the first prescribed range.

(7) In the preferred embodiment described above, the same evaluation index (wave width) is used in the determination process and the extraction process. However, a different evaluation index may be used for each process.

(8) In the preferred embodiment described above, all actual mark waves WM adjacent to the actual noise waves WN are targeted as noise-adjacent waves in the exclusion process. However, of the two actual mark waves WM adjacent to a single actual noise wave WN, the printer 1 may target just the actual mark wave WM nearest the actual noise wave WN in the exclusion process to acquire a large number of probable mark waves WM' that can be used to determine positional relationships among the marks.

(9) Since the reflectance of the black marks 81 is greatly different from the reflectance of the surface of the belt 31, as described above, signal waves corresponding to the black marks 81 have a relatively large gradient that is not easily influenced by the actual noise waves WN. Therefore, in the exclusion process, the printer 1 may refrain from excluding signal waves that correspond to marks of a color having a reflectance that is greatly different from that of the surface of the belt 31.

(10) In S405 of the exclusion process described in the preferred embodiment, the printer 1 determines whether the height of the actual noise wave WN is no greater than the second threshold TH2, but the present invention is not limited to this method. That is, since the effect of a noise wave is very slight when the noise wave is relatively small compared to the noise-adjacent wave, it is possible to determine the relative size of the noise wave. For example, the printer 1 may determine whether the relative height or relative ratio of the noise wave to the noise-adjacent wave is no greater than a prescribed threshold.

(11) In the preferred embodiment described above, the printer 1 forms the detection pattern 83 on the belt 31, but the present invention is not limited to this medium. For example, if the photosensors 53 are positioned above the belt 31, the printer 1 may be configured to form the detection pattern 83 on a sheet 7 conveyed on top of the belt 31.

(12) In the preferred embodiment described above, the present invention is applied to a process for calibrating formed line spacing, but the present invention is not limited to this process. For example, the printer 1 may perform a registration process to correct positional deviations (color registration error) among images of the four colors black, cyan, magenta, and yellow formed on the sheet 7. In other words, the printer 1 may use sensors or the like to determine positional relationships of a plurality of marks on the belt 31 or another medium and may perform a process to correct image quality based on the determination results.

(13) As an example of the registration process described above, the printer 1 forms a registration pattern on the belt 31, the registration pattern including a plurality of groups with each group comprising a set of marks for four colors, and determines the positional relationships among marks of the four colors in each group based on the detection signals SA inputted from the photosensors 53. The printer 1 determines the final positional relationships among marks of each color based on the average positional relationships for all groups and generates calibration data to correct color registration error based on the determination results.

When handling a plurality of marks in units of groups in this determination process, it is preferable to exclude an entire group when a signal wave corresponding to one mark in the group is excluded.

(14) In the preferred embodiment described above, the CPU 61 is configured to perform A/D conversion on the detection signal SA to acquire the actual signal waveform of the detection signal SA in digital form. However, the CPU 61 may be configured to compare the level of the detection signal SA to a reference level (the screening value TH0 described above, for example) to obtain a binary signal. In this case, the CPU 61 determines the positions of marks and executes the extraction process and the like based on each pulse wave in the binary signal.

What is claimed is:

1. An image-forming device comprising:

an image-forming unit configured to form a plurality of marks on an object;

a sensor configured to detect light reflected on the object, the reflected light including a plurality of waveforms;

a control unit configured to operate as a calculating unit that calculates a first value of each waveform in a predetermined evaluation index, a second value of a basic waveform corresponding to an ideal mark in the predetermined evaluation index, and a matching rate of each waveform with the basic waveform based on both each first value and the second value; and an extracting unit that extracts, from the plurality of waveforms, waveforms whose matching rates satisfy a predetermined condition.

2. The image-forming device according to claim 1, wherein the plurality of waveforms including a plurality of first waveforms whose matching rates are equal to or more than a predetermined rate and a plurality of second waveforms whose matching rates are less than the predetermined rate, and wherein the extracting unit extracts the plurality of first waveforms from the plurality of waveforms.

3. The image-forming device according to claim 2, wherein the extracting unit extracts the plurality of first waveforms from the plurality of waveforms by excluding the plurality of second waveforms.

4. The image-forming device according to claim 1, wherein the calculating unit uses an average value of the plurality of first values as the second value.

5. The image-forming device according to claim 1, wherein the predetermined condition depends on a degree of variation of the plurality of first values.

6. The image-forming device according to claim 5, wherein the predetermined condition depends on a standard deviation of the plurality of first values.

7. The image-forming device according to claim 1, wherein the evaluation index includes at least one of a height of the waveform, wave width of the waveform, and a relative position of the waveform to another waveform.

8. The image-forming device according to claim 1, wherein the plurality of marks includes a first mark to a last mark arranged in a predetermined direction, and the sensor detects the light in order from the first mark to the last mark, and wherein the extracting unit fails to extract waveforms corresponding to the first mark and the last mark, regardless of the matching rates of the first mark and the last mark.

9. The image-forming device according to claim 1, wherein the calculating unit fails to calculate the matching rates of waveform whose first value is out of a reference range.

10. The image-forming device according to claim 9, further comprising a storing unit that stores the number of waveform whose first value is out of the reference range, wherein the image-forming unit changes the number of the plurality of marks to be formed based on the number stored in the storing unit.

* * * * *